United States Patent
Simal et al.

(10) Patent No.: US 9,404,008 B2
(45) Date of Patent: Aug. 2, 2016

(54) ELASTOMERIC POLYMER COMPOSITIONS FOR COATINGS AND SEALANTS

(75) Inventors: François Simal, Ottignies-Louvain-la-Neuve (BE); David Vanaken, Sugar Land, TX (US); Jijun Wang, CV Deventer (NL)

(73) Assignee: HEXION INC., Columbus, OH (US)

( * ) Notice: Subject to any disclaimer, the term of this patent is extended or adjusted under 35 U.S.C. 154(b) by 17 days.

(21) Appl. No.: 14/000,108

(22) PCT Filed: Feb. 15, 2012

(86) PCT No.: PCT/EP2012/000746
§ 371 (c)(1),
(2), (4) Date: Nov. 21, 2013

(87) PCT Pub. No.: WO2012/113534
PCT Pub. Date: Aug. 30, 2012

(65) Prior Publication Data
US 2014/0072817 A1    Mar. 13, 2014

(30) Foreign Application Priority Data
Feb. 22, 2011  (EP) .................................. 11001445

(51) Int. Cl.
C09D 133/06 (2006.01)
C09D 133/08 (2006.01)
C09J 133/06 (2006.01)
C08F 220/68 (2006.01)
E04B 1/14 (2006.01)

(52) U.S. Cl.
CPC ............ *C09D 133/08* (2013.01); *C08F 220/68* (2013.01); *C09D 133/06* (2013.01); *C09J 133/06* (2013.01); *E04B 1/14* (2013.01); *Y10T 428/31667* (2015.04)

(58) Field of Classification Search
None
See application file for complete search history.

(56) References Cited

U.S. PATENT DOCUMENTS

| | | |
|---|---|---|
| 4,252,931 A | 2/1981 | Marquardt et al. |
| 4,322,516 A | 3/1982 | Wiest et al. |
| 4,831,077 A | 5/1989 | Ball et al. |
| 4,847,341 A | 7/1989 | Ball et al. |
| 4,908,268 A | 3/1990 | Mudge |
| 5,525,656 A | 6/1996 | Heiling et al. |
| 6,576,698 B1 | 6/2003 | Weitzel |
| 2007/0088120 A1* | 4/2007 | Zecha et al. ............... 524/832 |
| 2015/0344606 A1 | 12/2015 | Simal et al. |

FOREIGN PATENT DOCUMENTS

| | | |
|---|---|---|
| EP | 0573037 A1 | 12/1993 |
| EP | 1318181 A1 | 6/2003 |
| EP | 1777241 A1 | 4/2007 |

OTHER PUBLICATIONS

Zhang Fengru, "Modification on Acrylic Pressure-Sensitive Cement", Journal of Jiaying University (Natural Science), No. 1, pp. 53-58 (Dec. 31, 1996), China. (Partial Trans.).

* cited by examiner

*Primary Examiner* — Sheeba Ahmed

(57) ABSTRACT

Polymer compositions for elastomeric coatings or sealants provide excellent balance properties between elongation to break, early water resistance, alkaline resistance and adhesion on unpolar substrates. The composition is free of volatile and toxic monomer such as acrylonitrile, or substituted acrylonitrile.

10 Claims, No Drawings

ELASTOMERIC POLYMER COMPOSITIONS FOR COATINGS AND SEALANTS

The invention relates to polymer compositions for elastomeric coatings or sealants with excellent balance properties between elongation to break, early water resistance, alkaline resistance and adhesion on unpolar substrates. The composition is free of highly volatile and toxic monomer such as acrylonitrile, or substituted acrylonitrile. The coatings comprise a polymer derived from vinyl ester of C5-C13 of branched tertiary alkyl acid, and alkyl acrylate or methacrylate and or other vinyl ester such as vinyl acetate and/or alkyl vinyl ester such as vinyl laurate. The polymeric compositions are useful in elastomeric wall and roof coatings and in sealant applications.

Elastomeric coatings are commonly used to protect wall and roof surfaces such as concrete, masonry, synthetic polymer membranes, foamed polyurethane insulation, aged roof shingles etc. Sealant is used to close small opening in many industries, for example, construction, automotive and aerospace industries. One of the most important properties required for these applications is that they need to have adequate flexibility and elongation to accept an elastic deformation of the contacted materials which expand and contract due to daily temperature swings. Moreover, elastomeric coating must form a sturdy barrier against moisture from wind-driven rain, and to reduce the likelihood of alkalinity and efflorescence especially on freshly applied masonry which is not completely cured. Sufficient adhesion on the materials is also very important, especially for roof coating which always includes some materials not easy to adhere, for example, thermoplastic polyolefin (TPO), ethylene propylene diene monomer rubber (EPDM) etc.

A recent publication, WO2007124399 is about a single polymer elastomeric coating and described the use of a substantial amount of repeating units from C8-C12 alkyl acrylate monomers and/or vinyl esters of C10-C12 versatic acids, along with 5-15 weight percent acrylonitrile, and optional other monomers. It provides sufficient long term elasticity to bridge cracks in the masonry substrate while forming a tack free surface that exhibits low dirt pick-up. It also shows good alkalinity and efflorescence resistance.

The drawback of the above mentioned prior art is the presence of highly flammable residual volatile and toxic acrylonitrile monomer or its derivatives in the polymer composition. Considering the potential safety issue, the industry still looks for acrylonitrile-free composition for elastomeric polymer which is able to provide good balanced properties for wall and roof coating as well as sealant applications.

We have found elastomeric polymer compositions based on vinyl ester of branched tertiary alkyl acid, or/and other vinyl ester such as vinyl acetate, vinyl laurate, and/or alkyl (metha)acrylate. In this invention there is no presence of highly flammable and toxic monomers, for example, acrylonitrile and its derivatives. The invented elastomeric polymer provides paint coatings sufficient elongation and tensile strength to counteract the elastic deformation happened on the contacted materials. It also provides excellent early water resistance, outstanding alkali resistance, and sufficient dry and wet adhesion on very difficult to adhere substrates such as thermoplastic polyolefin.

The polymer compositions of the invention, must comprise at least 10 weight percent (wt %) of vinyl ester of C5-C13 of branched tertiary alkyl acid, and/or at least 10 weight percent (wt %) of alkyl C8-C36 vinyl ester in combination with alkyl acrylate (and/or methacrylate) with an alkyl chain of 4 to 12 carbon atoms, and/or 0-19 weight % vinyl acetate. The polymer compositions may contain lower alkyl (C1 to C3) acrylate and/or methacrylate monomers to achieve the desired glass transition temperature of the polymer. The polymer compositions are free from acrylonitrile or methyl acrylonitrile, or styrenic derivatives.

In one embodiment the polymer compositions comprise from 10 to 45 wt % of vinyl ester of C5-C13 of branched tertiary alkyl acid and from 50 to 85 wt % of alkyl acrylate and/or methacrylate with an alkyl chain of 4 to 12 carbon atoms. A preferred polymer composition comprises from 15 to 40 wt % of vinyl ester of C5-C13 of branched tertiary alkyl acid and from 55 to 80 wt % of alkyl acrylate and/or methacrylate with an alkyl chain of 4 to 12 carbon atoms. A most preferred polymer composition comprises from 15 to 35 wt % of vinyl ester of C9-C13 of branched tertiary alkyl acid and from 60 to 75 wt % of alkyl acrylate and/or methacrylate with an alkyl chain of 4 to 12 carbon atoms.

In another embodiment the polymer compositions comprise from 10 to 45 wt % of vinyl ester of C5-C13 of branched tertiary alkyl acid and from 15 to 45 wt % of alkyl acrylate and/or methacrylate with an alkyl chain of 4 to 12 carbon atoms and 25 to 55 wt % of vinyl acetate. A preferred polymer composition comprises from 15 to 40 wt % of vinyl ester of C5-C13 of branched tertiary alkyl acid and from 20 to 40 wt % of alkyl acrylate and/or methacrylate with an alkyl chain of 4 to 12 carbon atoms and 0-19 weight % of vinyl acetate. A most preferred polymer composition comprises from 15 to 40 wt % of vinyl ester of C9-C13 of branched tertiary alkyl acid and from 20 to 40 wt % of alkyl acrylate and/or methacrylate with an alkyl chain of 4 to 12 carbon atoms and 0-19 weight % of vinyl acetate.

In a further embodiment the polymer compositions comprise from 10 to 25 wt % of alkyl C8-C36 vinyl ester in combination with from 25 to 75 wt % of alkyl acrylate (and/or methacrylate) with an alkyl chain of 4 to 12 carbon atoms. A preferred polymer composition comprises from 10 to 20 wt % of alkyl C8-C36 vinyl ester in combination with 30 to 70 wt % of alkyl acrylate (and/or methacrylate) with an alkyl chain of 4 to 12 carbon atoms. A most preferred polymer composition comprises from 10 to 30 wt % of vinyl laurate in combination with 30 to 70 wt % of alkyl acrylate (and/or methacrylate) with an alkyl chain of 4 to 12 carbon atoms.

In the above compositions the vinyl ester of C5-C13 of branched tertiary alkyl acid used could be the vinyl ester of pivalic acid, Versatic acid 9, Versatic acid 10, Versatic acid 11 and Versatic acid 13 (Versatic is a trade mark of Momentive Specialty Chemicals).

In the above compositions the alkyl acrylate or methacrylate with an alkyl chain that could be butyl, isobutyl, pentyl, neopentyl, hexyl, heptyl, octyl, isooctyl, 2-ethyl-hexyl, nonyl, decyl, isodecyl, undecyl and dodecyl, 3,5,5-trimethyhexyl. The preferred are alkyl acrylate or methacrylate with an alkyl chain that could be butyl, isobutyl, hexyl, octyl, 2-ethyl-hexyl, nonyl, dodecyl, 3,5,5-trimethyhexyl. The most preferred are alkyl acrylate or methacrylate with an alkyl chain that could be butyl, 2-ethyl-hexyl, nonyl, 3,5,5-trimethyhexyl.

In the above compositions the alkyl C8-C36 vinyl ester with an alkyl chain that could be octyl, 2-ethyl-hexyl, nonyl, decyl, isodecyl, undecyl, dodecyl, 3,5,5-trimethyhexyl, and vinyl laurate. The preferred are alkyl C8-C36 vinyl ester with an alkyl chain that could be octyl, 2-ethyl-hexyl, nonyl, decyl, isodecyl, dodecyl, and vinyl laurate. The most preferred are alkyl C8-C36 vinyl ester with an alkyl chain that could be 2-ethyl-hexyl, nonyl, decyl, and vinyl laurate.

Another component optionally present is repeating units of mono or polycarboxylic acid groups (other than esters of said carboxylic acids). These are present in amounts less than 5 wt. % on average based on the weight of said and in another embodiment less than 3 wt. %, and still another embodiment less than 1 wt. % (e.g., acrylic acid, methacrylic acid, crotonic acid, itaconic acid, fumaric or maleic acid). In another embodiment, the polymer may include repeating units derived from unsaturated monomers containing phosphonic acids, sulphonic acids like 2-Acrylamido-2-methylpropane sulfonic acid (AMPS), and their salts. Other repeating units may be derived from monomers selected from vinyl monomers such as vinyl chloride or vinylidene chloride, N-vinyl pyrolidone, acrylamides, substituted acrylamides, vinyl ethers.

Another component present is repeating units acting as cross-linking segments in polymer chains. They could be ethylene glycol dimethacrylate, glycidyl methacrylate, tripropylene glycol diacrylate etc. These are present in amounts less than 3 wt. % based on the total weight of monomers in the composition. Another component optionally present is photosensitive composition which can be activated by UV light. It may copolymerize into polymer chain, or includes acting as one kind of additives.

The binder of the coating desirably has a glass transition temperature from −45° C. to +15° C. In another embodiment, the glass transition temperature is from −40 to 10° C.

The polymer can be made by any polymerization method. Emulsion polymerization is preferred in one embodiment. The emulsion polymerization techniques used to prepare such emulsion polymer binders are well known in the art.

Adjuvants useful in the preparation of the polymer binder and/or in its subsequent use and which may be added during or subsequent to the polymerization reaction may include auxiliary surfactants, defoamers, leveling agents, antioxidants, plasticizers and preservatives.

Test Methods

Dirt Pick Up Resistance

A paint coating was applied on aluminium substrate with a wet thickness 0.2 mm. Dry the film overnight at 23° C. and 50% relative humidity. Apply iron oxide slurry (56% brown iron oxide in demineralized water) on half of the paint coating by brush and allow it drying for 2 hours at 23° C. and 50% relative humidity. Then remove the stain by gently rubbing with a clean towel under running water until no more stain leaves the coating. After cleaning, the panel was dried under 23° C. and 50% relative humidity overnight. Measure the Y-reflectance of the coating with and without iron oxide stain. The dirt pick-up resistance is reported as the ratio (%) of Y-reflectance of the area with iron oxide to that of the area without iron oxide. Y-reflectance was measured by the Ultrascan XE. A high ratio (%) indicates of better dirt pick-up resistance.

Measure the dirt pick up resistance of each coating before and after 8 hours ultraviolet A treatment. Repeat twice for each system.

Alkali Resistance

A 25 mm square paint film with dry thickness of 0.5 mm was kept in 10% NaOH aqueous solution at 50° C. for three weeks. For each system, three samples were kept separately in vials. Monitor the film (integrity, swelling, crack and deterioration) each day in the period of three weeks. A rate for the film situation was made based on the visual observation.

Elongation and Tensile Strength (ASTM D2370 and D6083)

A paint coating was applied on silicone release paper by motor-driven adjustable blade film applicator in one coat. It was dried under 23° C. and 50% relative humidity for 14 days. The film should be flipped over after 7 days. Finally achieve a film with dry thickness around 0.5 mm. The free films are cut into a strip shape measuring 75 mm long by 13 mm wide. At least 10 specimens are prepared for each system. These specimens should not exhibit any nicks or flaws. Measure the thickness of each specimen at three locations through the gage length (the gage length is 25 mm) and take the average value. The specimen is elongated with a cross head speed 25 mm/min until the rupture of the film occurs.

The elongation E, in percentage is calculated with equation E=100×ΔL/L, where ΔL is the increase in specimen length to break, L is initial specimen length (gage length). The tensile strength, TS, in MPa, was calculated by the equation TS=F/(TW), where, F is tensile pull to rupture in N, T is the thickness of test specimen in mm, and W is the width of test specimen, in mm. Report the average of the results obtained from those uniformity of the tensile strength and elongation results obtained.

Water Liquid Vapor Permeability (ASTM D1653 and D6083)

Cut the paint film with a dry thickness around 0.5 mm into a piece which matches the cap of a bottle for measuring permeability. Pour 8 ml demineralized water into the bottle, seal the open area of the bottle cap with coated side of the paint film toward the water in the bottle and the uncoated side exposed to the air. The test is run in the inverted position with water in contact with the film. The samples were kept in a cabinet under 23° C. and 50% relative humidity. Weigh the loaded bottles to 1 mg every 24 hours for 7 days. Each system repeats three times. Put all the data of one system into the curve of loss weight (g) versus time (day), linearly fitting the data, the slope of the line is the loss rate of liquid (LR) with unit g/day or g/24 h. Calculate the water liquid vapor transmission rate, WLVT, with metric units (g/24 h/m$^2$) as following: WLVT=LR/A, where A is the size of the open area with unit m$^2$. Transfer WLVT from metric units into metric perms units by dividing water saturated vapor pressure 20.5 mmHg at 23° C. Transfer WLVT from metric perms units into US perms units by dividing 1.51735.

Adhesion on Thermoplastic Polyolefin (ASTM C794 and D903)

Cut the thermoplastic polyolefin (produced by Firestone Building Products) with size 152 mm long by 76 mm wide. Place a strip of masking tape 25 mm wide across the test surface of the substrate so that the lower edge of the tape is parallel and at least 76.2 mm from the lower short edge of the substrate. Apply a coating over the 102 by 76 mm area, which includes the masking tape, to a depth slightly more than 2.0 mm, put one piece of mesh (180 mm long by 76 mm wide) onto the paint coating, forcing it into the coating until the paint thoroughly penetrated the mesh. Dry the specimens at 23° C. and 50% relative humidity overnight. Then coat another layer of the paint with less than 1 mm wet thickness to help minimize mesh failure. Then dry the film under 23° C. for 20 days.

For dry adhesion measurement, after the film fully dried, make four cuts with a sharp blade lengthwise of the specimen, cutting completely through to the substrate surface, and remove excess material, and leave two 25 mm wide strips by a space about 9.5 mm. For wet adhesion measurement, immerse the sample into demineralised water for 7 days at 23° C. Quickly wipe it after taking the specimen out of water, immediately make the samples and do wet adhesion measurement.

The samples were measured by a tensile tester TT-1100 (ChemInstruments). Peel the specimen back at an angle of 180 degree at a rate of separation of 50 mm/min. Peel the paint film for about one minute and record the average peel force (PF) in Newtons which indicated by the recording chart of the machine. Test four strips for each of the substrate. Calculate the adhesion with unit N/m using peel force in N dividing the width of sample 0.025 m. Take the average adhesion as final result.

EXAMPLES

Synthesis of Polymer Emulsion

Initially charge the defined surfactant solution into the reactor, heat it up with nitrogen flow until 85° C. Add a shot of initiator solution into reactor. When temperature reaches 85° C. again, add a shot of 2.5% (weight/weight) pre-emulsion (monomers and surfactant), stop the nitrogen flow and maintain a nitrogen blanket through run. After 15 minutes of seed formation, the left pre-emulsion is gradually fed in a period of 2.5 hours at 85° C. Feed the initiator solution simultaneously separately in a period of 3 hours and 15 minutes. Immediately after feeding pre-emulsion, add the defined benzophenone solution in 30 minutes. Then hold the reaction at 85° C. for one hour. In order to reduce residual monomer, cool down to 60° C., adjust pH around 4 with buffer solution and add a shot of Bruggolite FF6M. After 5 minutes, feed Bruggolite FF6M and tert-butyl hydroperoxide separately in 90 minutes. Finally cool down to 30° C., neutralize with ammonia solution to pH around 8 and add biocide.

Procedure for Vinyl Acetate Based Polymer Emulsion

Initially charge the defined surfactant solution into the reactor, heat it up with nitrogen flow until 60° C. Add a shot of initiator solution into reactor. When temperature reaches 60° C. again, add a shot of 2.5% (weight/weight) pre-emulsion (monomers and surfactant) for seed formation, stop the nitrogen flow and maintain a nitrogen blanket through run. Reset temperature to 80° C. The left pre-emulsion is gradually fed in three hours at 80° C. Feed the initiator solution simultaneously separately in three hours and fifteen minutes. Post cook at 80° C. for one hour immediately after finishing the feed of pre-emulsion. In order to reduce residual monomer, cool down to 60° C., adjust pH to a value of 4 with buffer solution and add a shot of Bruggolite FF6M. After 5 min, feed Bruggolite FF6M and tert-butyl hydroperoxide separately in 90 minutes. Finally cool down to 30° C., neutralize with ammonia solution to pH around 8 and add biocide.

TABLE 1

The invented polymer compositions

| Composition | BA | 2-EHA | MMA | AA | MAA | VV | VAM | VL |
|---|---|---|---|---|---|---|---|---|
| 1 | 57.8 | 15 | 10.2 | 1 | 1 | 15 | 0 | 0 |
| 2 | 66.8 | 0 | 1.2 | 1 | 1 | 30 | 0 | 0 |
| 3* | 0 | 34.5 | 0 | 1 | 1 | 30 | 33.5 | 0 |
| 4* | 0 | 24.3 | 0 | 1 | 1 | 30 | 43.7 | 0 |
| 5 | 45.5 | 15 | 22.5 | 1 | 1 | 0 | 0 | 15 |

*no benzophenone added in the polymer composition

All the values are expressed in weight percent.
BA: butyl acrylate, 2-EHA: 2-ethylhexyl acrylate, MMA: methyl methacrylate, AA: acrylic acid, MAA: methacrylate acid, VV: VeoVa™ 10, VAM: vinyl acetate, VL: vinyl laurate. BA, 2-EHA, MMA, AA, MAA and VAM were supplied by Sigma Aldrich. VeoVa 10 was supplied by Momentive Specialty Chemicals.

Procedure for Paint Formulation

Charge the initial ingredients of pigment slurry to the mixing kettle, adding pigment in order as specified under low agitation speed to facilitate pigment addition and to minimize foam generation. After all the pigments are in the kettle, stop the mixer and scrape the sides and bottom of the kettle. Turn the mixer back on and grind with good vortex at high speed for 20 minutes to obtain a good grind. Letdown at low agitation for 15 minutes.

TABLE 2

Typical paint formulation

| Paint ingredients | Weight (g) |
|---|---|
| GRIND | |
| Part A | |
| Natrsol 250MR | 4.44 |
| Water | 143.46 |
| TAMOL 901 | 4.6 |
| Propylene glycol | 26 |
| Foamaster NXZ | 2.8 |
| Kathon 893F | 1.1 |
| Part B | |
| Ti-pure R-960 | 75 |
| Duramite | 425 |
| Kadox 915 (ZnO) | 25 |
| LETDOWN | |
| Part C | |
| Emulsion (a) | 520.2 |
| Foamaster NXZ | 2.8 |
| Part D | |
| Water | 7.5 |
| Texanol | 8 |
| Kathon 893F | 1.1 |
| Part E | |
| NH$_4$OH | 1 |

Note:
the formulation was based on the suggested formulation on the technical bulletin of Rhoplex ™ EC-2848 from Dow (former Rohm&Haas).
(a): Emulsion was one of the polymer emulsions made according to the Table 1 or one of commercial products, Elastene 2848 or Rhoplex EC-1791 produced by Dow.

TABLE 3

Ingredients and suppliers

| Ingredients | Supplier |
|---|---|
| Natrsol 250MR | Hercules International GmbH |
| TAMOL 901 | Dow |
| Foamaster NXZ | Cognis GmbH |
| Kathon 893F | Dow |
| Ti-pure R-960 | DuPont |
| Duramite | Imerys |
| Kadox 915 | Horsehead Corporation |
| Propylene glycol | Sigma-Aldrich |
| Texanol | Alfa Aesar |
| NH$_4$OH | Sigma-Aldrich |

TABLE 4 paints viscosity of the invention and comparative systems

| Paint (a) | Viscosity (KU) |
|---|---|
| 1 | 96 |
| 2 | 99 |
| 3 | 94 |
| 4 | 94 |
| 5 | 104 |
| Elastene 2848 | 83 |
| Rhoplex EC-1791 | 78 |

(a): The paints were denoted by the binders used in the system. The binders from 1 to 5 were the polymer emulsions made according to the corresponding composition in Table 1. Elastene 2848 and Rhoplex EC-1791 were commercial products produced by Dow.

Properties of the Elastomeric Coatings

TABLE 5 dirt pick up resistance.

| Paint | Reflectance before UV treatment(%) | Reflectance after UV treatment(%) |
|---|---|---|
| 1 | 25.7 | 41.6 |
| 2 | 27.7 | 37.1 |
| 3 (a) | 22.2 | 25.9 |
| 4 (a) | 24.9 | 26.3 |
| 5 | 34.2 | 59.3 |
| Elastene 2848 | 24.3 | 42.2 |
| Rhoplex EC-1791 | 22.9 | 34.8 |

(a) These paints contain no benzophenone which is photosensitive chemical and can be activated by UV light.

The paints of the invention (1-5) show comparable values to the benchmarks

TABLE 6 water liquid vapor permeability

| Paint | Water permeability (US perms) |
|---|---|
| 1 | 1.9 |
| 2 | 1.5 |
| 3 | 7.9 |
| 4 | 10.7 |
| Elastene 2848 | 86.0 |
| Rhoplex EC-1791 | 56.6 |

TABLE 7

Elongation in % for initial, after 1 day and 7 days water immersion

| Paint | Initial | 1 day | 7 days |
|---|---|---|---|
| 1 | 209 | 280 | 270 |
| 2 | 227 | 235 | 240 |
| 3 | 621 | 1069 | 1526 |
| 4 | 960 | 2100 | 2100 |
| Elastene 2848 | 426 | 752 | 710 |
| Rhoplex EC-1791 | 211 | 400 | 401 |

TABLE 8

Tensile strength in MPa for initial, after 1 day and 7 days water immersion

| Paint | Initial | 1 day | 7 days |
|---|---|---|---|
| 1 | 2.1 | 0.5 | 0.5 |
| 2 | 1.8 | 0.5 | 0.4 |
| 3 | 0.8 | 0.1 | 0.2 |
| 4 | 0.9 | 0.2 | 0.2 |
| Elastene 2848 | 1.8 | 0.4 | 0.3 |
| Roplex EC-1791 | 2.9 | 0.4 | 0.4 |

TABLE 9

Alkali resistance, after 1 day, 7 days and 21 days immersion in 10% NaOH aqueous solution.

| Paint | 1 day | 7 days | 21 days |
|---|---|---|---|
| 1 | No damage | slight damage | damaged |
| 2 | No damage | No damage | slight damage |
| 3 | Slight damage | strong damage | destroyed |
| 4 | Slight damage | strong damage | destroyed |
| Elastene 2848 | destroyed | — | — |
| Rhoplex EC-1791 | destroyed | — | — |

The rating is a visual evaluation the samples after immersion.

The paints of the invention show a clear improved behavior over the tested benchmarks.

TABLE 10 adhesion on TPO

| Paint | Dry adhesion (N/m) | Wet adhesion (N/m) |
|---|---|---|
| 1 | 49.3 | 11.9 |
| 2 | 78.6 | 12.6 |
| 3 | 508.9 | 207.2 |
| 4 | 734.6 | 255.2 |
| Elastene 2848 | 29.1 | 0 |
| Rhoplex EC-1791 | 36.4 | 16.6 |

The invention claimed is:

1. A composition comprising an elastomeric vinyl ester-acrylate-acid polymer emulsion consisting essentially of monomers of:
   a vinyl ester comprising an alkyl C8-C36 vinyl ester with an alkyl chain selected from the group of octyl, 2-ethylhexyl, nonyl, decyl, isodecyl, undecyl, dodecyl, and 3,5,5-trimethyhexyl, or vinyl laurate;
   one or both of an alkyl acrylate or methacrylate, each with an alkyl chain of 4 to 12 carbon atoms;
   and a monocarboxylic or polycarboxylic acid selected from the group consisting of acrylic acid, methacrylic acid, crotonic acid, itaconic acid, fumaric acid, maleic acid, and combinations thereof,
   wherein the polymer composition is free of acrylonitrile, methyl acrylonitrile and styrenic derivatives.

2. The composition of claim 1, wherein the alkyl C8-C36 vinyl ester comprises from 10 to 25 wt % of the composition and the alkyl acrylate, methacrylate, or both, comprises from 25 to 75 wt % of the composition.

3. The composition of claim 1 wherein the alkyl C8-C36 vinyl ester comprises from 10 to 20 wt % of the composition and the alkyl acrylate, methacrylate, or both, comprises from 30 to 70 wt % of the composition.

4. The composition of claim 1 wherein the vinyl laurate comprises from 10 to 30 wt % of the composition and the alkyl acrylate, methacrylate, or both, comprises from 30 to 70 wt % of the composition.

5. A polymer comprising the composition of claim 1 having a glass transition temperature from −45° C. to +15° C.

6. A binder composition comprising the composition of claim 1, wherein the binder composition further comprises a photosensitive chemical which can be activated by UV light promoting the crosslinking of an elastomeric coating or sealant.

7. The binder composition of claim 6 wherein the photosensitive chemical comprises 0.01 to 2.0 wt % of a benzophenone derivative based on the weight of the polymer.

8. A coated masonry object comprising, a masonry substrate and an elastomeric coating comprising the composition of claim 1.

9. A sealing mastic composition comprising the binder composition of claim 6.

10. The composition of claim 1, wherein the elastomeric vinyl ester-acrylate-acid polymer emulsion consisting essentially of monomers of butyl acrylate, 2-ethylhexyl acrylate, methyl methacrylate, acrylic acid, methacrylate acid, and vinyl laurate.

* * * * *